United States Patent
Yamine (10) Patent No.: US 10,306,522 B2
(45) Date of Patent: May 28, 2019

(54) METHOD AND ARRANGEMENT FOR AUTOMATED HANDLING OF NEIGHBOUR CELL RELATIONS

(75) Inventor: Badawi Yamine, Beirut (LB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 876 days.

(21) Appl. No.: 13/980,216

(22) PCT Filed: Feb. 14, 2011

(86) PCT No.: PCT/SE2011/050158
§ 371 (c)(1),
(2), (4) Date: Jul. 17, 2013

(87) PCT Pub. No.: WO2012/112087
PCT Pub. Date: Aug. 23, 2012

(65) Prior Publication Data
US 2013/0295938 A1    Nov. 7, 2013

(51) Int. Cl.
*H04W 36/00*    (2009.01)
*H04W 64/00*    (2009.01)

(52) U.S. Cl.
CPC ... *H04W 36/0083* (2013.01); *H04W 36/0061* (2013.01); *H04W 36/00835* (2018.08); *H04W 64/003* (2013.01)

(58) Field of Classification Search
CPC .............................. H04W 36/24; H04W 36/245
See application file for complete search history.

(56) References Cited

U.S. PATENT DOCUMENTS

| 5,982,758 A | 11/1999 | Hamdy |
| 6,061,337 A * | 5/2000 | Light ................... H04W 36/32 370/331 |

(Continued)

FOREIGN PATENT DOCUMENTS

| WO | 9636190 A1 | 11/1996 |
| WO | 9927736 A1 | 6/1999 |
| WO | 2010026438 A1 | 3/2010 |

OTHER PUBLICATIONS

3G Americas; "The Benefits of SON in LTE, Self-Optimizing and Self-Organizing Networks", Dec. 2009; pp. 1-26; http://www.3gamericas.org/documents/2009_%203GA_LTE_SON_white_paper_12_15_09_Final.pdf; Section 3.2.3-3.2.4.

(Continued)

*Primary Examiner* — Hilina K Demeter
(74) *Attorney, Agent, or Firm* — Sage Patent Group (57) ABSTRACT

The present invention relates to a method in a network node for handling neighbor cell relations in a cellular communications network, the network node serving user equipments in a first cell, wherein the network node, upon reception of an indication from a user equipment that a second cell is a potential handover candidate cell for said user equipment based on radio condition criteria, is configured to add said second cell to a neighbor cell relation list. The method comprises applying at least one additional criterion for determining if said second cell should be added to the neighbor cell relation list; and if said at least one additional criteria is not met, then rejecting the addition of said second cell to the neighbor cell relation list even if radio condition criteria for addition of the second cell to the neighbor cell relation list are fulfilled.

13 Claims, 6 Drawing Sheets

(56) References Cited

U.S. PATENT DOCUMENTS

| | | | |
|---|---|---|---|
| 6,188,904 B1* | 2/2001 | Marsan | H04W 36/0061 455/436 |
| 6,285,874 B1* | 9/2001 | Magnusson | H04W 16/00 455/456.1 |
| 8,125,958 B2* | 2/2012 | Medapalli | H04W 36/14 370/331 |
| 8,811,990 B2* | 8/2014 | Jeong | H04W 36/0058 455/435.2 |
| 2004/0224696 A1 | 11/2004 | Korneluk et al. | |
| 2006/0199545 A1* | 9/2006 | Abusch-Magder | H04W 16/22 455/67.11 |
| 2009/0003279 A1* | 1/2009 | Abusch-Magder | H04W 36/00835 370/331 |
| 2009/0264130 A1 | 10/2009 | Catovic et al. | |
| 2009/0318144 A1 | 12/2009 | Thomas et al. | |
| 2010/0028700 A1 | 2/2010 | Wu | |
| 2010/0113021 A1* | 5/2010 | Vare | H04W 64/003 455/436 |
| 2010/0178932 A1* | 7/2010 | Hansson | G01S 19/06 455/456.1 |
| 2010/0184434 A1* | 7/2010 | Jeong | H04W 36/0058 455/435.2 |
| 2010/0278142 A1* | 11/2010 | Dwyer | H04W 36/0066 370/331 |
| 2011/0263282 A1* | 10/2011 | Rune | H04J 11/0093 455/507 |
| 2012/0300657 A1* | 11/2012 | Jung | H04W 24/10 370/252 |
| 2012/0314604 A1* | 12/2012 | Siomina | H04W 64/00 370/252 |
| 2013/0115959 A1* | 5/2013 | Amirijoo | H04W 36/00837 455/440 |

OTHER PUBLICATIONS

NGMN Alliance; "Requirement Specification—Next Generation Mobile Networks Recommendation on SON and O&M Requirements", Next Generation Mobile Networks; Release Date: Dec. 5, 2008; pp. 1-53; http://www.ngmn.org/uploads/media/NGMN_Recommendation_on_SON_and_O_M_Requirements.pdf; Section 2.4, 3.1-3.2.

Sujuan Feng, Eiko Seidel; "Self-Organizing Networks (SON) in 3GPP Long Term Evolution"; Novel Mobile Radio Research (NOMOR), May 20, 2008; pp. 1-15; Nomor Research GmbH, Munich, Germany; http://www.nomor.de/uploads/gc/TQ/gcTQfDWApo90sPfQwQoBzw/SelfOrganisingNetworksInLTE_2008-05.pdf; Section 1.

* cited by examiner

Fig. 1

(PRIOR ART)

METHOD AND ARRANGEMENT FOR AUTOMATED HANDLING OF NEIGHBOUR CELL RELATIONS

FIELD OF THE INVENTION

The present invention relates to automated handling of neighbour cell relations.

BACKGROUND

The third generation partnership Project, 3GPP, is currently working on standardizing the next generation of mobile communication system denoted Long Term Evolution, LTE, also referred to as Evolved UTRAN or e-UTRAN. LTE is based on a flat architecture compared to 2G and 3G systems such as DSM and WCDMA. Each cell is served by a base station called eNodeB (eNB), and handover between between cells are handled mainly by signaling directly between the eNodeBs and not via any radio network controller. The cell broadcasts an identifying signature, referred to as Physical Cell Identity, PCI, which the user equipments use to identify cells. Since the handover function in LTE is distributed to the eNodeB, each eNodeB keeps a neighbor cell relation list of plausible handover candidates with connectivity information as well as a mapping between the PCI and a unique E-UTRAN cell global identifier, ECGI.

In GSM and in UMTS the neighbor cells, i.e. handover candidates, were configured manually by means of drive tests and performance analysis. This is time consuming and requires a lot of effort.

Thus, manually provisioning and managing neighbor cells in traditional mobile network is a challenging task and it becomes more difficult as new mobile technologies are being rolled out while 2G/3G cells already exist. Therefore, in addition to defining intra LTE neighbor relations for eNodeBs, an operator has to provide neighboring 2G, 3G, CDMA2000 cells as well.

For this reason a new feature called Automated Neighbor Relations, ANR, was introduced in LTE. Thanks to this feature, neighbor cells are added to and removed from the neighbor cell relation list automatically without human intervention. The purpose of the Automatic Neighbour Relation (ANR) functionality is thus to relieve the operator from the burden of manually managing Neighbor Relations (NRs).

In LTE, the ANR function thus resides in the eNodeB and keeps the conceptual Neighbor Relation Table (NRT), also referred to as Neighbor Cell Relation list. Located within ANR, a Neighbor Detection Function finds new neighbors and adds them to the NRT. ANR also contains a Neighbor Removal Function which removes outdated neighbor cells relations. The Neighbor Detection Function and the Neighbor Removal Function are implementation specific.

An existing Neighbor cell Relation (NR) from a source cell to a target cell means that eNodeB controlling the source cell knows the E-UTRAN Cell Global Identifier, ECGI/CGI, and Physical Cell Identifier (PCI) of the target cell and has an entry in the NRT for the source cell identifying the target cell.

For each cell, the eNB keeps an NRT. For each NR, the NRT contains the Target Cell Identifier (TCI), which identifies the target cell. For E-UTRAN, the TCI corresponds to the E-UTAN Cell Global Identifier (ECGI) and Physical Cell Identifier (PCI) of the target cell.

The ANR function relies on cells broadcasting their identity on global level, E-UTRAN Cell Global Identifier (ECGI) and allows the O&M system to manage the NRT. The O&M system can add and delete neighbor relations, NR. It can also change the attributes of the NRT. The O&M system is informed about changes in the NRT.

Figure 1:
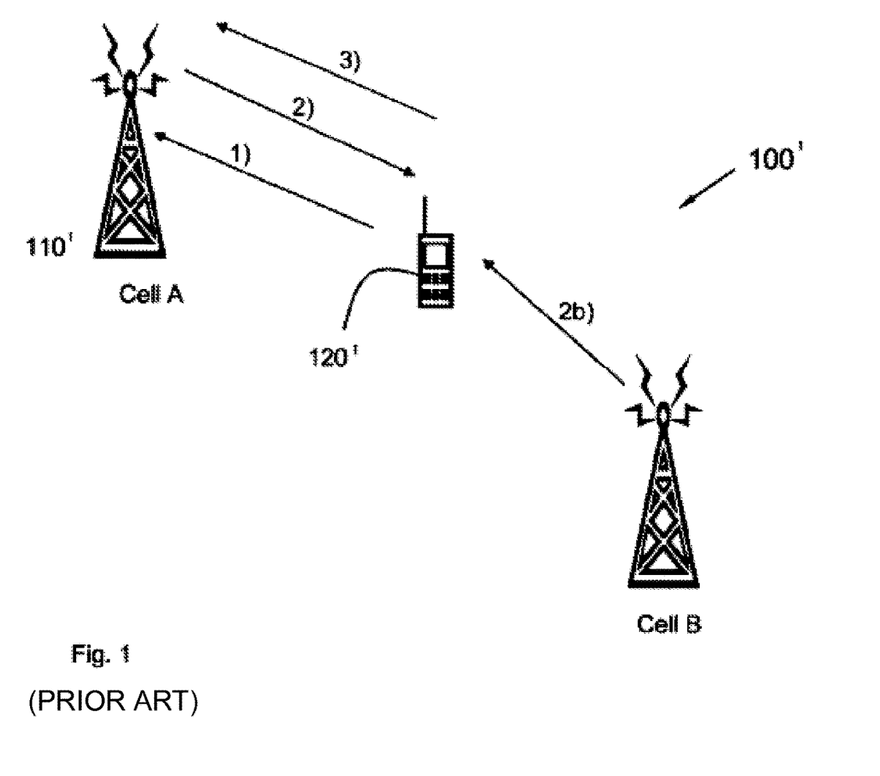
FIG. 1 illustrates the general functionality of ANR.

The basic functionality of ANR is illustrated in the cellular radio network 100' shown in FIG. 1. An eNodeB serving a cell with ANR function instructs user equipments to perform measurements on neighbor cells as a part of the normal call procedure. The eNodeB may use different policies for instructing the UE to do measurements, and when to report them to the eNodeB. If a user equipment 120' in Cell A, by measurements, detects that the signal received from a neighbor cell B is strong, it reports the measurement result to the eNodeB 110' of Cell A in step 1. However at this stage neither the user equipment 120' nor the eNodeB 110' knows the unique Global Cell Identity (Global-CID), which is an element of ECGI, of Cell B. For this reason the eNodeB 110' orders the mobile in step 2 to read the broadcast channel BCCH of cell B and obtain the Global-CID. The user equipment 120' gets that information in step 2b) by reading the BCCH and sends the information to the eNodeB 110' of cell A in another measurement report in step 3. In addition, the user equipment reports the tracking area code and all Public Land Mobile Network, PLMN, IDs that have been detected. The eNodeB 110' of cell A stores all this information in its ANR database and configures cell B as a neighbor to cell A, i.e., cell B is listed as a handover candidate in the NRT.

However, it may happen that in the network, for different reasons, a base station, e.g. an eNodeB, of a cell broadcasts its coverage far beyond its planned area. This could cause interference to other user equipments communicating outside the planned coverage area of said base station. Operators may detect such behaviors for example by monitoring drop calls statistics, or by performing some drive test, or by analyzing call traces triggered remotely from Operation and Maintenance Center, OMC.

Moreover, if such distant cell is added to the neighbor relation table in an eNodeB as a candidate target cell, problems would arise if a user equipment was handed over from said eNodeB to the distant cell.

SUMMARY

Embodiments of the present invention aim to avoid problems that may arise from adding a non desired cell as neighbor, i.e. handover candidate, to the neighbor cell relation list.

A first aspect of an embodiment of the invention relates to a method in a network node for handling neighbor cell relations in a cellular communications network. The network node is serving user equipments in a first cell, associated with a first cell site. The network node, upon reception of an indication from a user equipment that a second cell, associated with a second cell site, is a potential handover candidate cell for said user equipment based on radio condition criteria, is configured to add said second cell to a neighbor cell relation list. The method comprises the steps of
    applying at least one additional criterion for determining if said second cell should be added to the neighbor cell relation list; and
    if said at least one additional criterion is not met, then rejecting the addition of said second cell to the neighbor cell relation list even if radio condition criteria for addition of the second cell to the neighbor cell relation list are met.

A second aspect of an embodiment of the invention is related to an arrangement in a network node adapted for controlling the addition of handover candidate cells in a cellular communications network, the network node being adapted for serving user equipments in a first cell, associated with a first cell site. The network node is configured to add said second cell to a neighbor cell relation list upon reception of an indication from a user equipment that a second cell, associated with a second cell site, is a potential handover candidate cell for said user equipment based on radio condition criteria. The arrangement comprises a processing unit configured to:

apply at least one additional criterion for determining if said second cell should be added to the neighbor cell relation list; and reject the addition of said second cell to the neighbor cell relation list if said at least one additional criterion is not met, even if radio condition criteria for addition of the second cell to the neighbor cell relation list are met.

In a particular embodiment, at least one additional criterion is related to the geographical location of the second cell site.

In another particular embodiment, a rejection of addition of said second cell to the neighbor cell relation list is reported to an operation and maintenance system of the network.

The cellular communications network may in a particular embodiment be an LTE communication system and the network node may be an eNodeB, adapted to be comprised in the LTE communication system.

As previously mentioned, the addition of a non desired neighbor cell on the neighbor cell relation list will cause problems such as dropped calls to be experienced. Even if the operator should eventually detect the undesired neighbor cell and attend to the problem, considerable time may go by before the problems are solved. This is especially true for large networks. Embodiments of the invention thus provide the advantage that the problems caused by addition of an undesired neighbor cell to the neighbor cell list are prevented to occur in the first place by preventing that a non desired neighbor cell is allowed to be added to the neighbor cell relation list.

Other objects, advantages and novel features of the invention will become apparent from the following detailed description of the invention when considered in conjunction with the accompanying drawings and claims.

BRIEF DESCRIPTION OF THE DRAWINGS

The foregoing and other objects, features and advantages of the invention will be apparent from the following detailed description of preferred embodiments as illustrated in the drawings.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Figure 2:
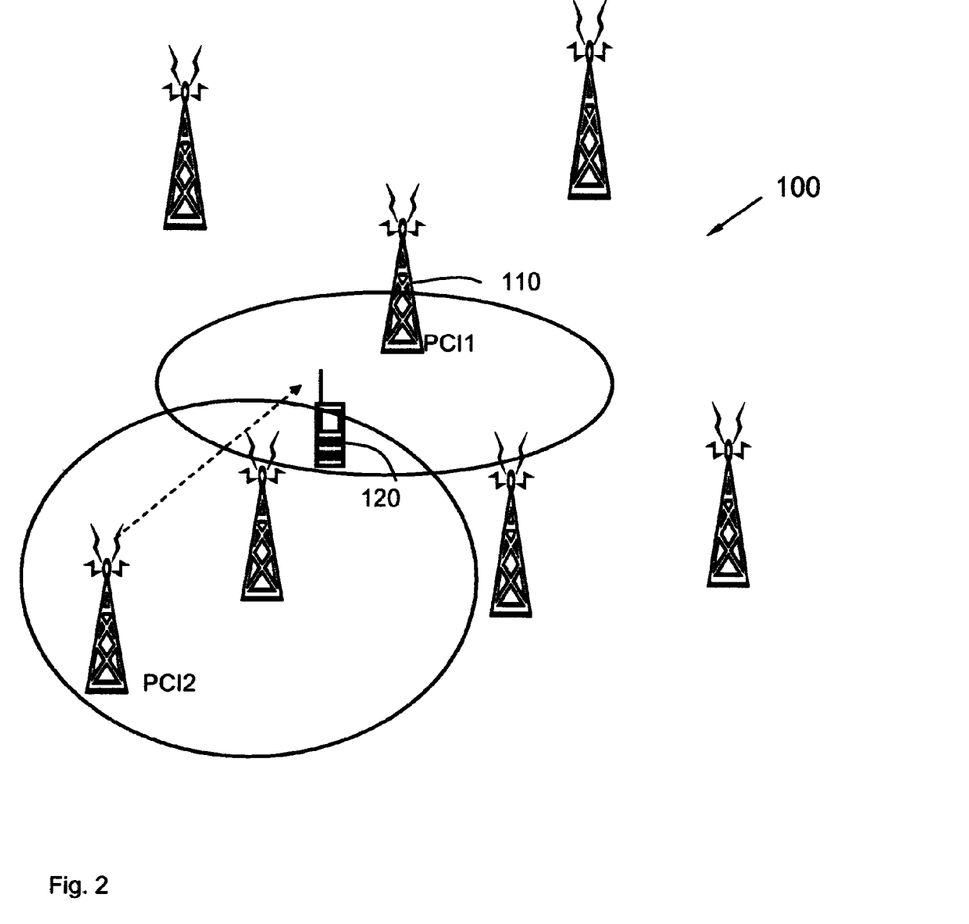
FIG. 2 illustrates a cellular radio network where a base station of a cell broadcasts its coverage beyond its planned area.

In FIG. 2 a cellular radio network 100 is illustrated. As shown in the figure, the signal of a cell represented by PCI2 is well received in some areas of cell PCI1, even though the distance between the base station PCI1 and PCI2 is large. This is an undesired behavior. Firstly, the distant cell PCI2 causes interference to the user equipments served by cell PCI1. Secondly, if this distant cell is added to the neighbour cell list as a candidate for handover in the eNodeB 110 serving cell PCI1, then at a certain point the user equipment might do a handover to the distant cell and would then be communicating with a cell at a far distance. This means the user equipment would use its maximum output power and create uplink interference in its surroundings. Furthermore, also the uplink radio channel quality of the user equipment is degraded due to the large distance to PCI2.

In order to prevent such situation, embodiments of the present invention proposes to add a new control function to the ANR algorithm by applying at least one additional criterion for determining if a potential handover candidate cell should be added to the neighbor cell relation list.

Said at least one additional criterion could for example be based on the geographical location of the potential new handover candidate cell in relation to the cell keeping the neighbor cell relation list in question.

Figure 3:
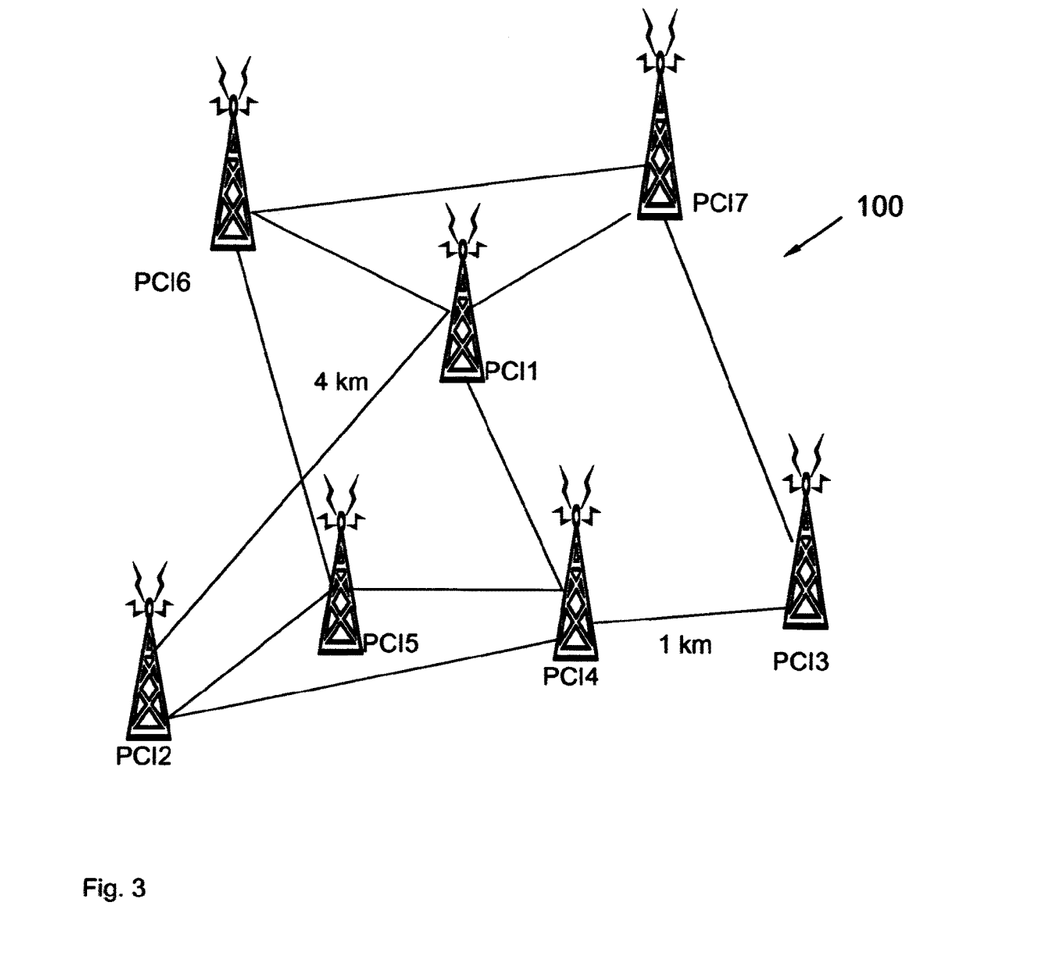
FIG. 3 illustrates the cellular radio network of FIG. 2, indicating geographical distances between different sites.

FIG. 3 illustrates geographical distances between different cell sites represented by antennas associated to base stations, each base station controlling at least one cell. The term cell site is herein used to refer to the geographical site where the one or more antennas of the cell are placed. The electronic communications equipment comprised in a network node, e.g. a base station, to which said antennas are associated, may be placed on the cell site, or in case of a distributed antenna system, at another location. The geographical locations of different cell sites are stored in a database located in the base station, e.g. the eNodeB, and in this database the geographical distance between different sites is calculated according to a proprietary algorithm comprised in the base station used for implementing embodiments of the invention.

The longitude and latitude of every antenna cell is already today comprised in the database of the base station. When a new base station is inserted in the network, its cell distance to other neighbor cells is calculated according to the proprietary algorithm and the result is stored in the database. Then this distance is used as an entry in the ANR. Thus, the distance between cells is calculated only once and not every time a candidate neighbor is checked if it is undesired or desired cell.

For example, the distance between the cell site of PCI4 and the cell site of PCI3 is 1 km. According to this algorithm not only the absolute distance between any two sites may be calculated. Other factors may also be considered. For example, as will be described in the following, the number of cell sites located between the serving cell and a potential handover candidate may be taken into consideration in the algorithm.

Figure 4:
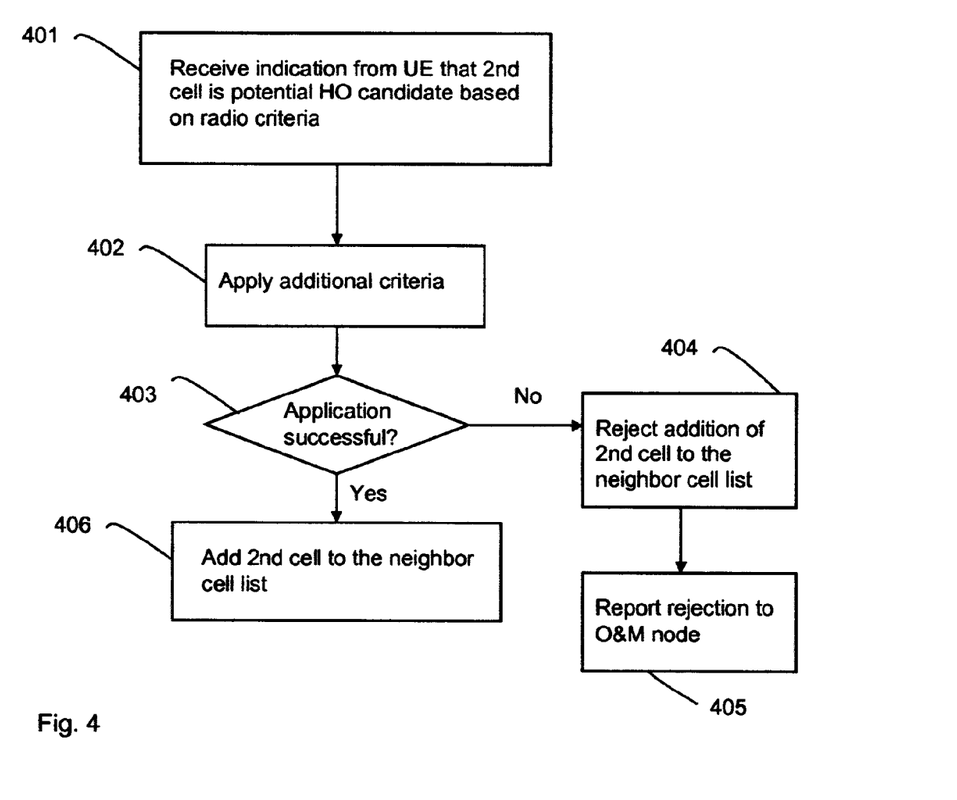
FIG. 4 shows a method according to an embodiment of the invention illustrated as a flow chart.

In FIG. 4 a flowchart illustrates method steps of an embodiment of the invention. In step 401 a network node, e.g. a base station such as an eNodeB, receives an indication from a user equipment being served by said base station that signaling received from a neighbor cell, hereinafter referred to as a second cell, is strong in terms of radio power. This indication may be received in a report based on measurements performed by the user equipment. Thus, such indication means that criteria based on radio conditions for adding said second cell to the neighbor cell relation list are complied with. In step 402, at least one other criterion, in addition to the radio criteria, is applied in order to determine if said second cell should be added to the neighbor cell relation list. If a comparison between the properties of the potential handover candidate cell and the at least one additional criterion indicate that one or more requirements for adding the second cell, i.e. the new potential handover candidate to the neighbor cell relation list are not complied with, the at least one additional criterion is not met and thus the second cell is not added to the neighbor cell relation list of the serving cell, see step 404. If the at least one additional criterion is met, see step 403, i.e. a comparison between the properties of the second cell and the at least one additional criterion indicate that requirements for adding a new handover candidate to the neighbor cell relation list are complied with, then the second cell is added to the neighbor cell relation list in step 406. In an optional step 405, relating to a particular embodiment, the decision to not add the second cell to the neighbor cell relation list even though radio condition criteria for being added to the list are met is reported to an operation and maintenance, O&M, system to indicate to the operator of the network that said second cell is broadcasting its coverage beyond its planned area, thereby enabling the operator to attend to the problem.

Particular embodiments where the at least one additional criterion is based on the geographical location of the second cell, i.e. the potential handover candidate cell in relation to the serving cell site keeping the neighbor cell relation list in question will be described in relation to the following embodiments:

In a particular embodiment, an additional criterion is applied by comparing the horizontal distance between the second cell site and the first cell site with a threshold, and rejecting the addition of said second cell to the neighbor cell relation list if the distance exceeds the threshold. Said threshold may be a predefined distance. Thus, the application of the at least one additional criterion (402), comprises in this particular embodiment that the distance between the cell site serving a particular user equipment and the cell site controlling the potential new handover candidate cell as indicated by said user equipment is compared to a threshold, whereby the criterion for adding the second cell to the neighbor cell relation list is met if said distance does not exceed the threshold. If for example the potential candidate cell is very far away from the serving cell, such that the distance exceeds the threshold, then this cell is considered to be an undesired cell on the neighbor cell relation list. Therefore, if this additional criterion is not met, this potential new candidate cell is not added to the neighbor cell relation list.

In another particular embodiment, in addition to the criterion relating to the horizontal distance between the cell sites, another additional criterion is applied by checking the difference in antenna height between the second cell site and the first cell site. For this purpose, different height ranges may be defined. For example, range 1 is for cell sites where the difference in antennas height is less than 5 meters, range 2 is for cell sites where the differences in height is between 5 and 15 meters and range 3 is for cell sites where the difference in heights is above 15 meters. The criterion relating to difference in height is thus in this embodiment considered together with the criterion relating to the horizontal distance between the first and second site. First the horizontal distance is checked and if it is below the threshold, then the height difference criteria is checked towards the defined height ranges. Which height range that is appropriate for a specific horizontal distance is implementation specific. Thus, the application of the at least one additional criterion (402) comprises in this particular embodiment that in addition to checking the criterion related to horizontal distance, the difference in height between the serving cell site and the cell site controlling the potential new handover candidate cell as indicated by said user equipment is compared to a defined height range, whereby the criterion for adding the second cell to the neighbor cell relation list is met if said difference of height is within the said defined height range. If for example the potential candidate cell site is located such that the difference in height is not within the defined height range, then this cell may be considered to be an undesired cell. Therefore, if this additional criterion is not met, this potential new candidate cell is not added to the neighbor cell relation list.

The at least one additional criterion may in particular embodiments be related to the geographical location of other cell sites in relation to said second cell site.

In a particular embodiment, an additional criterion is applied by checking if at least a certain number of other cell sites are located between the first cell site and the second cell site, and rejecting the addition of said second cell to the neighbor cell relation list if so. Thus, the application of the at least one additional criterion (402), comprises in this particular embodiment that it is checked whether one or more other cells are located between the potential new candidate cell and the serving cell site. In such case, even though the horizontal distance to the potential new candidate cell may be below a threshold, the candidate cell may be considered as undesired for the neighbor cell relation list. In such case the application of additional criteria could comprise the step of checking if there are other cells located between the serving cell site and the potential candidate cell, and if so, the additional criterion is not met.

Particular additional criterion may be applied separately or in combination. For example, in particular embodiments a single additional criterion such as the criterion relating to the horizontal distance between cell sites may be applied in order to determine if a potential new handover candidate should be added to the neighbor cell relation list. Alternatively, in other particular embodiments two or more additional criteria are applied. For example, if a cell site A in a crowded area has Cell site B at 0.5 km radius distance away & Cell site C at 1 km radius away & Cell D at 1.5 km radius away, then even though 1.5 km distance might not be considered as an undesired distance, and a height difference criterion might be met, Cell D is considered as an undesired cell, because there are two sites, Cells B & Cell C located between Cell A (serving cell) & Cell D (neighbor candidate). Thus, in this example three additional criteria are applied such that if the calculated distance between one cell and its candidate neighbor is below the specified threshold and the height difference criteria is met, then another additional criteria relating to the number of cells in between a serving cell and a candidate neighbor is applied. This may for example apply when sites are close to each other and the distance between cells is small, like in city centers.

Figure 5A:
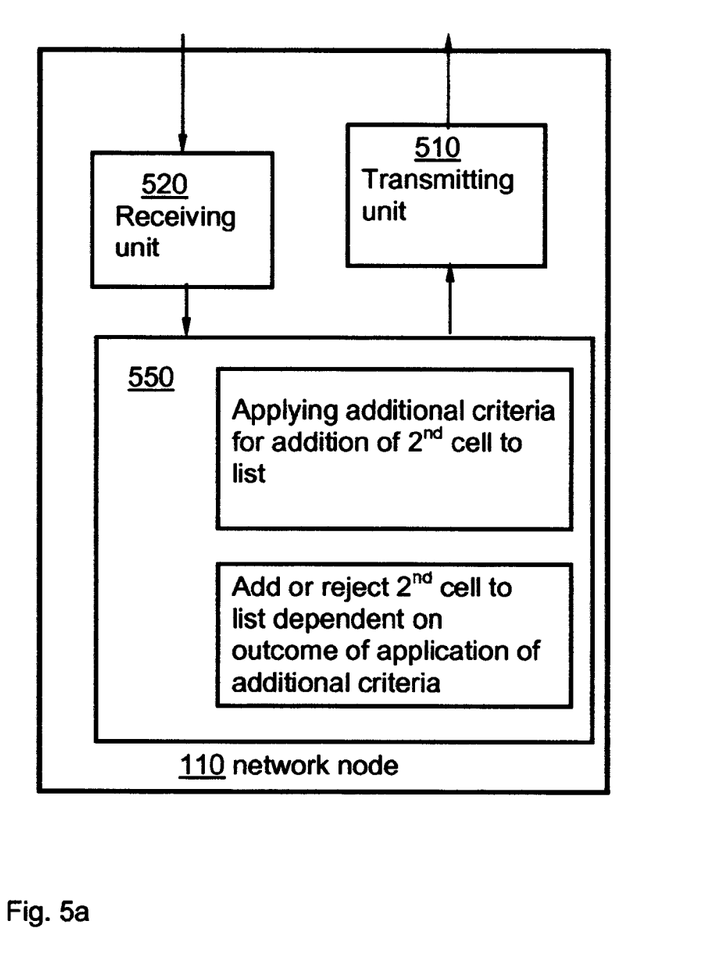
FIG. 5a is a schematic block diagram illustrating an embodiment of an arrangement in a network node according to an embodiment of the invention.

FIG. 5a shows schematically an embodiment of an arrangement in a network node 110. The arrangement comprises a transmitting unit 510 capable of transmitting e.g. data and control signaling to a user equipment 120, a receiving unit 520 capable of receiving signaling from said user equipment 120. The arrangement furthermore comprises a processing unit 550 configured to apply at least one other criterion, in addition to the radio criteria, in order to determine if said second cell should be added to the neighbor cell relation list in accordance with the method steps described in relation to FIG. 4. This may be implemented by adding a control function algorithm to an existing ARN algorithm controlled by the processing unit 550.

In a particular embodiment, the processing unit (550) is configured to apply additional criteria by comparing the horizontal distance between the second cell site and the first cell site with a threshold, and rejecting the addition of said second cell to the neighbor cell relation list if the distance exceeds the threshold.

In another particular embodiment, the processing unit (550) is configured to apply an additional criterion by comparing the difference in antenna height between the second cell site and the first cell site with a defined height range, and rejecting the addition of said second cell to the neighbor cell relation list if the difference in height is not within said height range.

In another particular embodiment, the processing unit (550) is configured to apply an additional criterion by checking if at least a certain number of other cell sites are located between the first cell site and the second cell site, and rejecting the addition of said second cell (PCI2) to the neighbor cell relation list if so.

In another particular embodiment, the processing unit (550) is configured to report a rejection of addition of said second cell (PCI2) to the neighbor cell relation list to an operation and maintenance system of the network.

The network node (110) may be an eNodeB comprised in an LTE communication system.

Figure 5B:
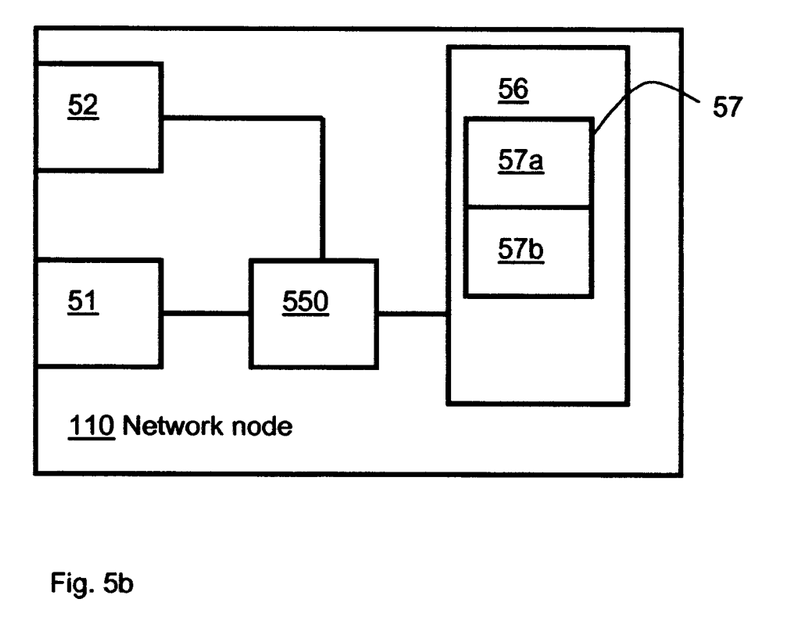
FIG. 5b is an alternative way of disclosing an embodiment of the arrangement in the network node.

FIG. 5b shows schematically an embodiment of the arrangement in the network node 110, which also can be an alternative way of disclosing an embodiment of the arrangement in the network node 110 illustrated in FIG. 5a. Comprised in the arrangement are here a processing unit 550 e.g. with a Digital Signal Processor (DSP) and an encoding and a decoding module. The processing unit 550 can be a single unit or a plurality of units to perform different steps of procedures described herein. The arrangement in the network node 110 furthermore comprises an output unit corresponding to the transmitting unit 510 in FIG. 5a and an input unit 52 corresponding to the receiving unit 520 in FIG. 5a. The input unit 52 and the output unit 51 may be arranged as separate units or as one single unit in the hardware of the arrangement in the network node 110.

Furthermore the arrangement in the network node 110 comprises at least one computer program product 56 in the form of a non-volatile memory, e.g. an Electrically Erasable Programmable Read-Only Memory (EEPROM), a flash memory and a disk drive. The computer program product 56 comprises a computer program 57, which comprises code means which when run on the processing unit 550 causes the arrangement to perform the steps of the procedures described earlier in conjunction with FIG. 4 and FIG. 5a.

Hence in the exemplary embodiments described, the code means in the computer program 57 comprises a module 57a for applying at least one additional criterion for determining if a second cell referred to as a potential new candidate cell should be added to the neighbor cell relation list and a module 57b for adding said second cell to the neighbor cell relation list if the at least one additional criterion is met and reject addition of said second cell to the neighbor cell relation list if said at least one additional criterion is not met. The modules 57a-b essentially perform the steps of the flow illustrated in FIG. 4 to emulate the device described in FIG. 5a.

Although the code means in the embodiment disclosed above in conjunction with FIG. 5b are implemented as computer program modules which when run on the processing unit 550 causes the processing unit to perform steps described above in the conjunction with FIG. 4, at least one of the code means may in alternative embodiments be implemented at least partly as hardware circuits.

The present invention may, of course, be carried out in other ways than those specifically set forth herein without departing from essential characteristics of the invention. The present embodiments are to be considered in all respects as illustrative and not restrictive.

The invention claimed is:

1. A method, in a network node, for handling neighbor cell relations in a cellular communications network, the network node serving a user equipment in a first cell associated with a first cell site, the method comprising:
  receiving an indication from the user equipment that a second cell, associated with a second cell site, is a potential handover candidate cell for the user equipment based on radio condition criteria;
  adding the second cell to a neighbor cell relation list of the network node based on at least one of:
    the geographical location of the second cell site;
    the geographical location of other cell sites in relation to the second cell site.

2. The method of claim 1, wherein the adding of the second cell to the neighbor cell relation list is based on:
  comparing a distance between the second cell site and the first cell site with a threshold; and
  determining that the distance does not exceed the threshold.

3. The method of claim 2, wherein the threshold is a predefined distance.

4. The method of claim 1, wherein the adding of the second cell to the neighbor cell relation list is based on:
  comparing a difference in antenna height between the second cell site and the first cell site with a defined height range; and
  determining that the difference in height is within the defined height range.

5. The method of claim 1, wherein the adding of the second cell to the neighbor cell relation list is based on:
  checking whether at least a certain number of other cell sites are located between the first cell site and the second cell site; and
  determining that fewer than the certain number of other cell sites are located between the first cell site and the second cell site.

6. The method of claim 1, further comprising reporting a rejection of a third cell from the neighbor cell relation list, the third cell being distinct from the second cell, to an operation and maintenance system of the network based on at least one of:
  the geographical location of the third cell site;

the geographical location of other cell sites in relation to the third cell site.

7. The method of claim 1, wherein the cellular communications network is an LTE communication system.

8. A network node configured to control addition of handover candidate cells in a cellular communications network, the network node configured to serve a user equipment in a first cell associated with a first cell site, the network node comprising:
a processing circuit configured to:
receive an indication from the user equipment that a second cell, associated with a second cell site, is a potential handover candidate cell for the user equipment based on radio condition criteria;
add the second cell to a neighbor cell relation list of the network node based on at least one of:
the geographical location of the second cell site;
the geographical location of other cell sites in relation to the second cell site.

9. The network node of claim 8, wherein to add the second cell to the neighbor cell relation list, the processing circuit is configured to:
compare a horizontal distance between the second cell site and the first cell site with a threshold;
determine that the distance does not exceed the threshold.

10. The network node of claim 8, wherein to add the second cell to the neighbor cell relation list, the processing circuit is configured to:
compare a difference in antenna height between the second cell site and the first cell site with a defined height range;
determine that the difference in height is within the defined height range.

11. The network node of claim 8, wherein to add the second cell to the neighbor cell relation list, the processing circuit is configured to:
check whether at least a certain number of other cell sites are located between the first cell site and the second cell site;
determine that fewer than the certain number of other cell sites are located between the first cell site and the second cell site.

12. The network node of claim 8, wherein the processing circuit is further configured to report, to an operation and maintenance system of the network, a rejection of a third cell from the neighbor cell relation list based on at least one of:
a geographical location of the third cell site;
a geographical location of other cell sites in relation to the third cell site.

13. The network node of claim 8, wherein the network node is an eNodeB.

* * * * *